United States Patent [19]

Bienert et al.

[11] Patent Number: 4,893,374
[45] Date of Patent: Jan. 16, 1990

[54] WINDSHIELD WIPER SYSTEM

[75] Inventors: Herbert Bienert, Besigheim; Bernd Walther, Bietigheim-Bissingen, both of Fed. Rep. of Germany

[73] Assignee: SWF Auto-Electric GmbH, Bietigheim-Bissingen, Fed. Rep. of Germany

[21] Appl. No.: 879,291

[22] Filed: Jun. 27, 1986

[30] Foreign Application Priority Data

Jun. 29, 1985 [DE] Fed. Rep. of Germany ....... 3523441

[51] Int. Cl.$^4$ ............................................. B60S 1/52
[52] U.S. Cl. ................................................. 15/250.04
[58] Field of Search ........... 15/250.01, 250.02, 250.03, 15/250.04, 250.19; 239/203, 204, 205, 206

[56] References Cited

U.S. PATENT DOCUMENTS

| | | | |
|---|---|---|---|
| 1,259,902 | 3/1918 | Porker | 239/204 |
| 1,919,196 | 7/1933 | Brooks | 239/206 |
| 1,964,269 | 6/1934 | Munz | 239/204 |
| 2,609,561 | 9/1952 | Wernig | 15/250.04 |
| 2,952,864 | 9/1960 | Nixon | 15/250.04 |
| 3,230,564 | 1/1966 | McDevitt | 15/250.04 |
| 3,887,956 | 6/1975 | Wind | 15/250.04 |

FOREIGN PATENT DOCUMENTS

| | | | |
|---|---|---|---|
| 882809 | 7/1953 | Fed. Rep. of Germany | 15/250.19 |
| 1091445 | 10/1960 | Fed. Rep. of Germany | 15/250.02 |
| 3521024 | 1/1986 | Fed. Rep. of Germany | |
| 8123044 | 7/1982 | France | |
| 194140 | 11/1982 | Japan | |
| 1051880 | 12/1966 | United Kingdom | 15/250.04 |

Primary Examiner—Philip R. Coe
Assistant Examiner—Joseph S. Machuga
Attorney, Agent, or Firm—Robert P. Seitter

[57] ABSTRACT

In a windshield wiper system a washing liquid channel runs through a bore in the wiper shaft and extends through a bore in the cap of a wiper arm, so that in the operating position of the cap the nozzle is arranged on that side of the cap which is opposite a fastening member, so that, in comparison with prior constructions, good cleaning effect is achieved due to an enlarged spacing between nozzle and window pane to be cleaned. So that the protruding nozzle body does not impede swivelling of the cap, the bore in the cap is larger than the outer diameter of the nozzle body and the annular gap between the rim of the bore in the cap and the nozzle body may be closed by an additional cap.

16 Claims, 2 Drawing Sheets

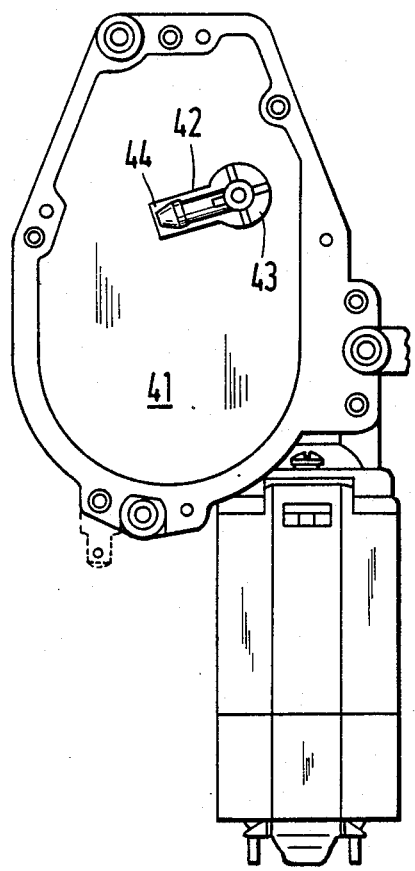
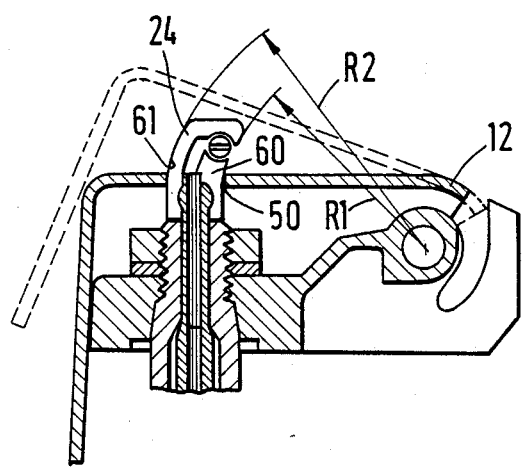

WINDSHIELD WIPER SYSTEM

BACKGROUND OF THE INVENTION

This invention relates to a windshield wiper system.

German patent No. 3,102,538 describes a windshield wiper system wherein the wiper shaft has a bore as a washing liquid channel and a ball nipple on the side of the wiper arm. The ball nipple is lockable with a correspondingly shaped ball socket on the cap swivellably articulated to the wiper arm. In this construction nozzles are laterally fitted on a cap made of plastics material. The wiper arm is mounted onto the wiper shaft in a conventional manner, whereby the connection between wiper shaft and fastening member is protected by a conventional swivellable cap. A leakproof connection between the ball nipple on the wiper shaft and the corresponding ball socket cannot always be ensured because of unavoidable component manufacturing tolerances. Furthermore in some applications the window pane to be cleaned is not sufficiently wetted with washing liquid. The reason is that the washing liquid jet abuts the window pane with a relatively flat angle. Accordingly the distance between the said window pane and the nozzles is relatively small.

U.S. Pat. Nos. 2,609,561 and 3,230,564 show windshield wiper systems in which the nozzle is spaced further from the window pane than in German patent No. 3,102,538, however these cases do not relate to today's conventional designs in which a wiper arm with a cap swivellably mounted on the fastening member and the cap covering the connection between fastening member and wiper shaft. One problem with these systems is the possibility that moisture will enter the area of the connection between fastening member and wiper shaft and result in corrosion. With such corrosion, the wiper arm may no longer be detached from the wiper shaft or a sufficient fit cannot be ensured.

SUMMARY OF THE INVENTION

The invention is therefore directed to providing an improved windshield wiper system of this kind in which the window pane is sufficiently wetted, whereby a proper functioning is to be ensured even after a long service life. For this purpose parts are to be used which are simple with regard to their construction and can be derived from parts readily available on the market.

The invention is thereby based on the consideration that a much better cleaning effect can be achieved by increasing the distance between the nozzle and the window pane to be cleaned. In order to accomplish this without departing from the usual construction of windshield wiper systems of this kind it is suggested according to the invention that the washing liquid channel shall extend through a bore in the cap, so that in the operating position of the cap the nozzle is arranged on that side of the cap which is opposite the fastening member.

With regard to a wiper arm with a swivellable cap, when the cap is tilted the rim of the bore moves on a circular path. When the washing liquid channel protruding far over the cap extends alongside a straight line, problems with a tilting of the cap would be a result and to ensure a satisfactory swivelling motion of the cap, the bore in the cap would have to be formed as a longitudinal hole. To solve this problem according to a preferred embodiment of the invention the bore in the cap is larger than the outside diameter of the washing liquid channel, so that the cap can be swivelled. The gap which is formed between the rim of the bore in the cap and the washing liquid channel is closed by an additional cap. This construction would appear to be a more complicated design. However such an embodiment can be produced at favourable costs with the usual injection-molding die, because apart from the bore no changes are necessary. Thus as far as the injection-molding technique is concerned the additional cap is a very simple part which can also be produced at favourable costs.

Theoretically this additional cap could be locked with the cap. However, this would also involve increased demounting efforts, because the additional cap has to be removed from the cap when the cap is to be swivelled. Therefore the additional cap is preferably directly or indirectly held on the wiper shaft. Thereby the cap is fixed in the axial direction of the wiper shaft such that at the side facing the nozzle it is at least substantially flush with the external surface of the covering wall of the cap. This is reasonable for styling and has the technical advantage that when the cap is tilted the additional cap and the cap cannot get clamped due to the small wall thickness of the cap.

To provide for a longer leak free service life the cap is coupled with the wiper shaft in a manner protected against twisting. Thus during wiper operation the additional cap rotates in the same direction with the cap, so that the surfaces of the additional cap and of the cap resting against each other are not subjected to friction.

In principle the washing liquid channel could also be coupled with the wiper shaft in a manner protected against twisting, thus a solution would in particular be conceivable in which the wiper shaft penetrates a bore of the cap. This arrangement has the advantage that the washing liquid jet always abuts the window pane to be cleaned at a defined spacing in front of the wiper blade. However, problems could appear with regard to the washing liquid hose which has to be connected with the wiper shaft which moves in pendulum fashion.

In a preferred embodiment of the invention the washing liquid channel is stationarily arranged. The result is a relative movement between the rim of the bore in the additional cap and the washing liquid channel. This area of the additional cap is suitably formed with a sealing lip which permits this relative movement between washing liquid channel and additional cap.

A separate plastics pipe is used as a washing liquid channel. The plastics pipe is stationarily arranged in a bore of the wiper shaft and protrudes over the front face of the wiper shaft. A nozzle body with a nozzle is locked on the end of the pipe and supported on the front face of the wiper shaft. On the opposite side a collar is formed onto the pipe, and fittingly encompasses the end of the wiper shaft. As seen in the axial direction, the position of the washing liquid channel within the wiper shaft is clearly determined without the use of additional means.

BRIEF DESCRIPTION OF THE DRAWING

The invention will be better understood from a reading of the following detailed description in conjunction with the drawing in which:

FIG. 2 is a view of the wiper system of FIG. 1 in the direction of arrow P; and

FIG. 3 is a partial section through a second embodiment of a wiper system.

DETAILED DESCRIPTION

Figure 1:
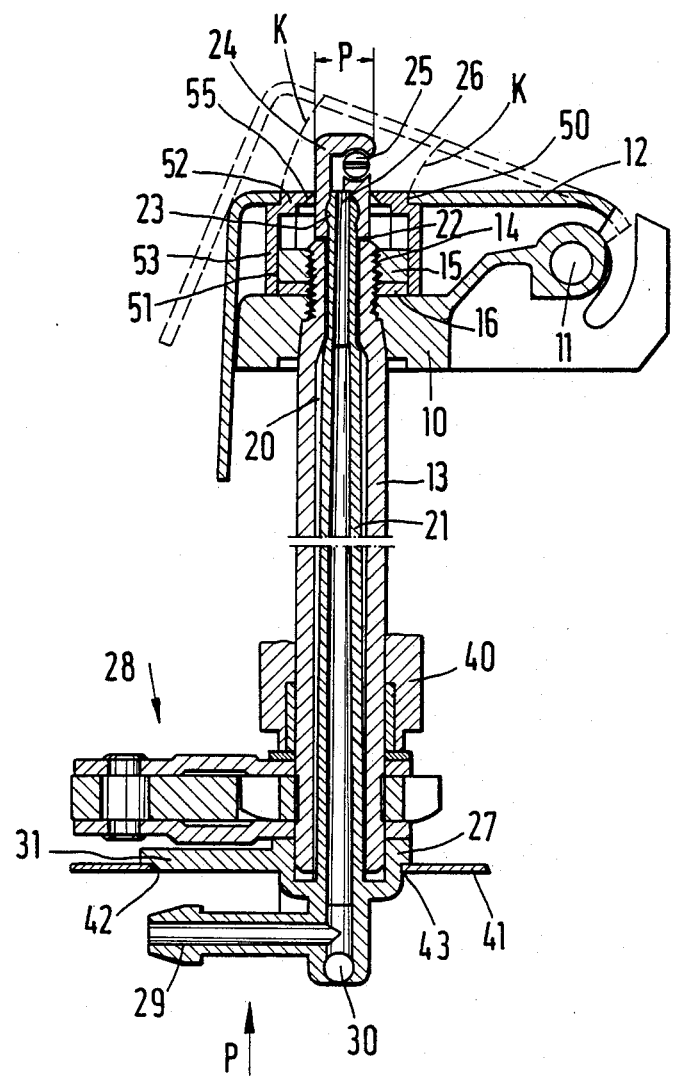
FIG. 1 is a partial section through a windshield wiper system in the area of the wiper shaft, only the principal parts of the wiper system are shown.

The wiper arm includes a fastening member 10 with a moving joint 11 for a link and a swivellable cap 12. Fastening member 10 is fixed to a wiper shaft 13, which has a thread portion 14 for a fastening nut 15 adjoining a conical portion. A sealing ring 16 is provided between the fastening nut 15 and the fastening member 10.

Wiper shaft 13 is penetrated by a bore 20 into which a plastics pipe 21 is inserted as a washing liquid channel. At the side of the wiper arm, plastics pipe 21 protrudes over the front face 22 of the wiper shaft and has a ball nipple 23 onto which is locked a nozzle body 24 with an adjustable nozzle 25. The nozzle body 24 is supported on the front face 22 of the wiper shaft 13 in the axial direction. Means 26 preventing rotation at the end of the plastics pipe 21 and on the nozzle body 24 provides a defined position of the nozzle body relative to the plastics pipe. The plastics pipe 21 also protrudes from the wiper shaft 13 at the other side and has an annular collar 27 there which fittingly encompasses the end of the wiper shaft 13. This annular collar 27 is supported on the gearing 28, via which the wiper shaft 13 may be driven in pendulum fashion. Furthermore a pipe union 29 for a washing liquid hose is integrally formed on the plastics pipe 21, which hose projects rectangularly from the plastics pipe 21 on grounds of space. For injection-molding purposes the pipe 21 is open at both sides and the end opposite the nozzle is closed by a ball-shaped plug 30.

Wiper shaft 13 protrudes in known manner from a gear housing, of which a bearing eye 40 has been indicated. This gear housing is closed by a cover 41, into which an aperture 42 is worked. Aperture 42 has a circular area 43, into which the annular collar 27 of the plastics pipe 21 fittingly engages. Furthermore aperture 42 has a radially projecting rectangular area 44, the contour of which is larger than the contour of the pipe union 29. Therefore the cover 41 can be put onto the gear housing in the axial direction cover 41 without tilting. To close aperture 42 completely, the plastics pipe has a radially projecting lug 31 which covers this rectangular area 44 of the aperture 42. Thereby the annular collar 27 and the rim of lug 31 simultaneously serve as a supporting surface for cover 41.

The washing liquid channel with the plastics pipe 21 extends through a bore 50 in the cap 12, so that, in the operating position of the cap, which is shown in FIG. 1, the nozzle 25 is arranged on that side of the cap 12 which is opposite the fastening member 10. In comparison with the example according to German patent No. 3,102,538 the spacing of this nozzle from the window pane to be cleaned is thereby significantly enlarged, so that the washing liquid jet abuts the window pane to be cleaned at a larger angle. The diameter of bore 50 in the cap is considerably larger than the outside diameter D of the washing liquid channel in the area of this bore 50, thus it is larger in the present embodiment than the diameter D of nozzle body 24. The gap between the rim of bore 50 in cap 12 and the washing liquid channel and nozzle body 24 may be closed by an additional cap 51. This additional cap 51 is cup-shaped as FIG. 1 shows. As seen in the axial direction there are two portions with different diameters. The diameter of the smaller portion 52 corresponds to the diameter of bore 50. The height of portion 52 corresponds to the thickness of cap 12, so that portion 52 is fittingly seated in bore 50 in the rest position of cap 12, whereby the outer surface of the additional cap is flush with the outer surface of the covering wall of the cap 12. The larger portion 53 forms a supporting surface for the cap 12. The cup-shaped additional cap is slipped upon the fastening nut 15 in a manner protected against twisting, so that the additional cap on the whole is connected with the wiper shaft 13 in a manner protected against twisting. The additional cap 51 is also made of plastics material and locked with this fastening nut 15. The additional cap 51 is supported on the fastening member 10 and thus additionally covers the connection between wiper shaft 13 and fastening member 10, so that this place is especially well protected.

Plastics pipe 21 is stationarily arranged within the wiper shaft 13. In contrast thereto, additional cap 51 rotates with the wiper shaft, so that at the rim of the bore in the additional cap a relative movement between this additional cap 51 and the nozzle body 24 is provided. Therefore a sealing lip 55 on the additional cap 51 is provided in this area.

In FIG. 1 one position of cap 12 is shown in broken lines. From the circular arcs K shown in broken lines it is seen that the diameter of bore 50 is selected in such a way that when the cap 12 is tilted from the rest position it cannot touch nozzle body 24. The position of additional cap 51 is thereby not changed, because it is in fact stationarily held in the axial direction.

With regard to the embodiment of FIGS. 1 and 2 that the conventional construction of the fastening between wiper arm and wiper shaft is substantially retained and the movability of the swivellable cap is not affected. The nozzle is arranged at an optimal place. The sealing of the connection between fastening member and wiper shaft is in a twofold way ensured by the cap and the additional cap. The construction effort for this embodiment is small, because the parts are easily injection-molded. By using a plastics pipe corrosion in the bore of the wiper shaft is avoided. Thus a reliable functioning windshield wiper system with a good cleaning efficiency is created.

In FIG. 3 a further embodiment is shown in which the nozzle body has such a curved contour that a cap 12 without an additional cap can be used. The generated surfaces 60 and 61 of this nozzle body 24 are circular arcs with radii R1 and R2 to the link 11. Thus in this embodiment the rim of the bore 50 in the cap 12 slides along these generated surfaces 60 and 61 of the nozzle body without the danger of getting clamped. However in this embodiment one needs different nozzle bodies with accordingly curved generated surfaces for different wiper arms, while in the embodiment according to FIG. 1 the same nozzle bodies can be used for all types of wiper arms. This is why the construction according to FIG. 1 is preferred.

Finally it is pointed out that in the drawing the preferred embodiments are only shown to such an extent that the basic ideas of the invention can be understood. Of course one could do without a plastics pipe within the wiper shaft if this wiper shaft is made from a stainless material. Then the wiper shaft itself could penetrate the aperture in the cap. Furthermore the plastics pipe could be lengthened at the side of the wiper arm, so that the spacing of the nozzle would be further increased and the nozzle body would be seated completely outside the cap. It could then be supported on the cover face of the cap and secure the rest position of the latter. In this case the nozzle body would have to be removed for tilting the cap, which should be avoided, if possible, in order to prevent leaks caused by multiple mounting and demounting actions. In the nozzle body could also be arranged several nozzles and the pipe could be coupled with the wiper shaft in a manner protected against twisting. In the embodiment shown in FIG. 1 the plastics pipe is inserted in the bore of the wiper shaft from the side of the drive. This also is not absolutely necessary, however this is a very favourable solution as far as mounting is concerned.

What is claimed is:

1. A windshield wiper system comprising:
   a fastening member for attachment to a wiper arm member, said fastening member being fixed onto a wiper shaft;
   a cap swivellably articulated onto said fastening member, said cap having an operating position wherein it covers the connection between said wiper shaft and said fastening member, said cap being pivotable from said operating position;
   a washing liquid channel extending within said wiper shaft;
   said cap having a bore through which said channel extends, said bore being larger than the outside diameter of said channel in the area of said bore to permit said cap to pass over said channel when said cap is articulated onto said fastening member; and
   a nozzle in fluid communication with said liquid channel, said nozzle being disposed on a side of said cap which is opposite said fastening member when said cap is in said operating position.

2. a windshield wiper system in accordance with claim 1, wherein:
   said system further comprises a second cap closing a gap between the rim of said bore and said channel.

3. A windshield wiper system in accordance with claim 2, wherein:
   said second cap is held stationary on said wiper shaft.

4. A windshield wiper system in accordance with claim 3, wherein:
   said second cap is fixed in the axial direction and has a side facing said nozzle and substantially flush with the external surface of said cap.

5. A windshield wiper system in accordance with claim 4, wherein:
   said second cap is coupled to said wiper shaft in a manner protected against twisting.

6. A windshield wiper system in accordance with claim 1, wherein:
   said channel has a portion extending over said cap and circular generated surfaces in the area of said portion, the centers of said generated surfaces coincide with a moving joint between said cap and said fastening member, the diameter of said bore being larger than the outside diameter of said channel.

7. A windshield wiper system in accordance with claim 1, wherein:
   said nozzle body has circular generated surfaces; the centers of which coincide with a moving joint between said cap and said fastening member, and the outside diameter of said bore being larger than the outside diameter of said nozzle body.

8. A windshield wiper system comprising:
   a fastening member for attachment to a wiper arm, said fastening member being fixed to a wiper shaft;
   a cap swivellably articulated onto said fastening member and having an operating position wherein it covers the connection between said wiper shaft and said fastening member, said cap being tiltable from said operating position;
   a washing liquid channel extending within said wiper shaft;
   said cap having a bore through which said channel extends; and
   a nozzle in fluid communication with said liquid channel and disposed on a side of said cap which is opposite said fastening member when said cap is in said operating position,
   said bore being larger than the outside diameter of said channel in the area of said bore;
   said system further comprising a cup-shaped second cap closing a gap between the rim of said bore and said channel said second cap being held stationary on said wiper shaft, being fixed in the axial direction and having a side facing said nozzle, said second cap being substantially flush with the external surface of said cap and being coupled to said wiper shaft in a manner protected against twisting; and
   said system including a fastening nut between said fastening member and said wiper shaft, said second cap being slipped on said nut in a manner protected against twisting.

9. A windshield wiper system in accordance with claim 8, wherein:
   said second cap has a first portion having a diameter equal to the diameter of said bore and a second portion having a wider diameter, said first portion having a height above said second portion equal to the thickness of said cap whereby said first portion is fittingly seated in said bore.

10. A windshield wiper system comprising:
    a fastening member for attachment to a wiper arm, said fastening member being fixed to a wiper shaft;
    a cap swivellably articulated onto said fastening member and having an operating position wherein it covers the connection between said wiper shaft and said fastening member, said cap being tiltable from said operating position;
    a washing liquid channel extending within said wiper shaft;
    said cap having a bore through which said channel extends;
    a nozzle in fluid communication with said liquid channel and disposed on a side of said cap which is opposite said fastening member when said cap is in said operating position,
    said bore being larger than the outside diameter of said channel in the area of said bore;
    said system further comprising a second cap closing a gap between the rim of said bore and said channel;
    said channel being held stationary; and
    said second cap including an aperture having a sealing lip which sealingly engages said channel.

11. A windshield wiper system in accordance with claim 10, wherein:
    said channel comprises a plastics pipe stationarily disposed in a ore of said wiper shaft, said pipe having an end protruding over the front face of said wiper shaft; and
    said nozzle has a nozzle body locked upon said pipe end, said nozzle body being supported on said wiper shaft front face.

12. A windshield wiper system in accordance with claim 11, wherein:
   the other end of said pipe protrudes from the other end of said wiper shaft and includes an integrally formed annular collar which fittingly encompasses said wiper shaft other end.

13. A windshield wiper system in accordance with claim 12, wherein:
   said pipe includes a pipe union extending therefrom, said pipe being closed by a plug below said pipe union.

14. A windshield wiper system in accordance with claim 12, comprising:
   a gear housing;
   a cover closing said gear housing and having an aperture;
   said wiper shaft protruding from said housing and said annular collar fittingly engaging said cover aperture.

15. A windshield wiper system in accordance with claim 14, wherein:
   said cover aperture has a radially projecting rectangular area the contour of which is larger than the contour of said pipe union.

16. A windshield wiper system in accordance with claim 15, wherein:
   said pipe includes an integrally formed radially projecting lug which closes said cover aperture rectangular area.

* * * * *